US005450587A

United States Patent [19]

Salm

[11] Patent Number: 5,450,587

[45] Date of Patent: Sep. 12, 1995

[54] EXPANDED MEMORY ADDRESSING SCHEME

[75] Inventor: Ingolf Salm, Gaeufelden, Germany

[73] Assignee: International Business Machines Corporation, Armonk, N.Y.

[21] Appl. No.: 976,116

[22] Filed: Nov. 13, 1992

[30] Foreign Application Priority Data

Nov. 16, 1991 [DE] Germany ........................ 91119576.6

[51] Int. Cl.[6] ............................................ G06F 12/06

[52] U.S. Cl. ............................ 395/700; 364/DIG. 1; 364/270.5; 364/270.3

[58] Field of Search ................ 395/700, 400; 364/200

[56] References Cited

U.S. PATENT DOCUMENTS

| | | | |
|---|---|---|---|
| 4,355,355 | 10/1982 | Botwell et al. | 364/200 |
| 4,366,537 | 12/1982 | Heller et al. | 364/200 |
| 4,430,705 | 2/1984 | Cannavino et al. | 364/200 |
| 4,500,952 | 2/1985 | Heller et al. | 364/200 |
| 4,577,272 | 3/1986 | Ho et al. | 364/200 |
| 4,779,187 | 10/1988 | Letwin | 364/200 |
| 4,782,443 | 11/1988 | Matsumoto | 364/200 |
| 4,825,358 | 4/1989 | Letwin | 364/200 |
| 4,843,541 | 6/1989 | Bean et al. | 364/200 |
| 4,943,913 | 7/1990 | Clark | 364/200 |
| 4,965,717 | 10/1990 | Cutts, Jr. et al. | 364/200 |
| 5,023,773 | 6/1991 | Baum et al. | 364/200 |
| 5,027,273 | 6/1991 | Letwin | 364/200 |
| 5,123,101 | 6/1992 | Sindhu | 395/400 |
| 5,251,308 | 10/1993 | Frank et al. | 395/425 |
| 5,276,829 | 1/1994 | Sano | 395/425 |
| 5,297,265 | 3/1994 | Frank et al. | 395/400 |

OTHER PUBLICATIONS

Duncan, Ray, "Advanced MSDOS Programming", Microsoft Press, 1988, pp. 203–215.

*Primary Examiner*—Kevin A. Kriess
*Assistant Examiner*—St. John Courtenay, III
*Attorney, Agent, or Firm*—Arthur J. Samodovitz

[57] ABSTRACT

A 31-bit addressing scheme is compatible with current 24-bit addressing schemes and allows an address space of 2 GB to be created. The shared area of the operating system is divided into two separate areas (230, 260), one (230) located at the bottom of the address space and the other (260) at the top of the address space. Between the shared areas (230, 260), a continuous private area (240, 270) is available for use by the applications software. In one embodiment of the invention, the size of the bottom shared area (230) is limited to 1 MB blocks so optimizing the use of private area (230) by applications programs written for 24-bit addressing.

12 Claims, 2 Drawing Sheets

/////// = INVALID

EXPANDED MEMORY ADDRESSING SCHEME

TECHNICAL BACKGROUND OF THE INVENTION

The invention concerns an N-bit addressed memory containing private area and shared area, and a method for addressing this memory.

DESCRIPTION OF THE PRIOR ART

The memory management techniques of a computer operating system serve two functions. Firstly, they optimize the use of the available storage media to be totally transparent to the applications programmer. The concepts behind such techniques are described in a number of different publications. Among these are "Operating Systems: Structure and Mechanisms" by Philippe A. Janon, Academic Press, Inc., London, 1985, pp 103–143, "Operating Systems: Design and Implementation" by Andrew S. Tanenbaum, Prentice Hall, Englewood Cliffs, 1987, pp 191 ff, and "Operating System Concepts" by James L. Peterson and Abraham Silberschatz, Addison-Wesley, Reading, Mass., 1983, pp 131–188.

In the IBM VSE/Enterprise Systems Architecture Version 1 Release 1 operating system a 24-bit memory addressing scheme is used which allows addresses spaces only up to a maximum size of 16 MB. The conceptual information relating to storage management in this operating system is described in "IBM VSE/Enterprise Systems Architecture: Guide to System Function, Version 1 Release 1", IBM Corp., 1990, Publication Number SC33-6511-00 which is hereby incorporated by reference.

As application programs for computers have become larger, the 16 MB restriction imposed by the use of 24-bit addressing has become a limiting factor in its development. Thus a need has arisen to increase the amount of memory space available by moving to an addressing scheme employing a larger number of bits. However, in order to protect customer investment, the new addressing scheme should allow software written for a 24-bit addressing scheme to continue to run under the expanded operating system.

The IBM MVS/XA operating system was also originally designed for a 24-bit addressing scheme and thus was also limited to address spaces of 16 MB maximum. However, to enable it to run on computers with architectures which allow 31 bits to be used, such as the IBM S/390 machines, it has been adapted to a 31-bit addressing scheme which allows up to 2 GB of storage to be directly addressed. FIG. 1 shows the memory structure used by MVS/XA in order to ensure that compatibility with application programs written for 24-bit addressing scheme is preserved. The memory structure 10 comprises a number of virtual address spaces 20*a–d*. Application programs written with a 24-bit addressing scheme reside in the private area 40 and use the common areas 50 and the prefix save area 30. Since the common areas 50 do not extend above the 16 MB boundary, compatibility with previous versions of the MVS operating system is preserved. Above the 16 MB boundary is a second set of common areas 60 and an extended private area 70 which extends up to 2 GB. These two areas can only be used by programs written with a 31-bit addressing scheme in mind. They can also make use of the common area 50 and private area 40. For a more detailed description of the MVS operating system, reference is made to "MVS Concepts and Facilities" by Robert H. Johnson.

The 31-bit addressing scheme used in the MVS operating system is not suitable for use in the VSE operating system if compatibility with 24-bit addressing versions is to be maintained. The reasons for this lie in the necessity of storage addresses in VSE to be aligned in 1 MB blocks. Thus the VSE operating system using this scheme would require one or more 1 MB blocks starting at 0 and one or more 1 MB blocks ending at 16 MB. This would be less than the number of 1 MB blocks available as private areas available in current versions of the VSE operating system and thus compatibility would not be preserved. Additionally, the "break" in the address spaces in MVS due to the common areas 50 and the extended common areas 60 (MVS common areas are equivalent to VSE shared areas) complicates the use of the address spaces as it is not possible to use both private areas as one continuous space.

SUMMARY OF THE INVENTION

The object of the invention is therefore to provide an extended memory addressing scheme which ensures compatibility with existing memory addressing schemes.

This object is achieved by splitting the shared areas required by the operating system in the address space into two parts. One part starts at the beginning of the address space and the other part is placed at the end of the address space. Between the two parts of the shared areas, the private areas of the addresses spaces are placed as one continuously addressable block.

The shared areas of the address space contain a number of shared programs and data, including the supervisor program and the system GETVIS space. This is an area which is reserved for system functions which need to acquire virtual storage dynamically during program execution. In one embodiment of the invention, all the system functions required by an applications program using 24-bit addressing are placed in the bottom part of the shared areas, whilst in another embodiment, some of the system functions are placed in the top part of the shared areas, but are called from routines found in the bottom part of the shared areas.

The private areas of the memory may contain one or more partitions. However, in one embodiment of the invention, no partition may begin at an address greater than 16 MB to ensure that compatibility is maintained between applications software running under a 31-bit addressing scheme and applications software running under a 24-bit addressing scheme.

DETAILED DESCRIPTION OF THE PREFERRED EMBODIMENTS

Figure 1:
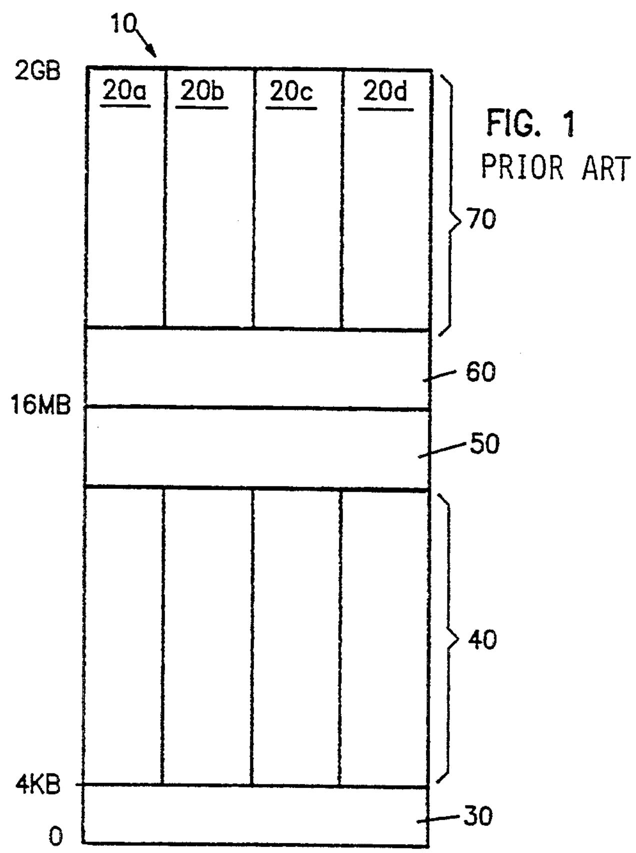
FIG. 1 shows a diagram of the 31-bit addressing scheme used in the MVS operating system.
Figure 2:
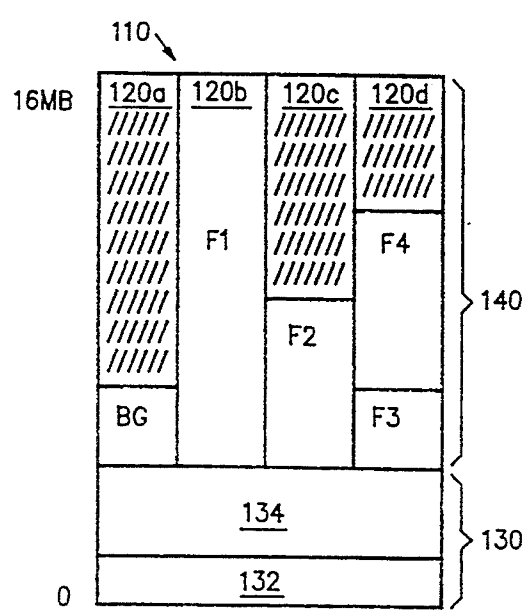
FIG. 2 shows a diagram of the 24-bit addressing scheme used in current VSE operating system.

FIG. 2 shows a memory structure 110 of the 24-bit addressing scheme of the current VSE operating System operating in ESA mode. The memory structure 110 comprises four address spaces 120a–d. Each of the address spaces 120a–120d has a private area 140 and access to the shared areas 130 of the operating system. The private areas 140 are unique to each address space 120a–d and may be divided into one or more partitions BG, F1, F2, F3, F4. The use of partitions is described in the above cited IBM Manual, Publication Number SC33-6511-00.

The shared areas 130 of the system are common to each address space 120a–d and hold the supervisor 132 and, in the shared area 134, the shared virtual area and any shared partitions. The shared virtual area contains frequently used programs and data which are available for concurrent use by programs executing in any of the partitions BG, F1–F4. One part of the shared virtual area is reserved for the system GETVIS area. The shared partitions are partitions which contain programs that can be accessed from any of the private areas. One example of such a program is VSE/POWER which is used to spool input and output to the private areas.

Figure 3:
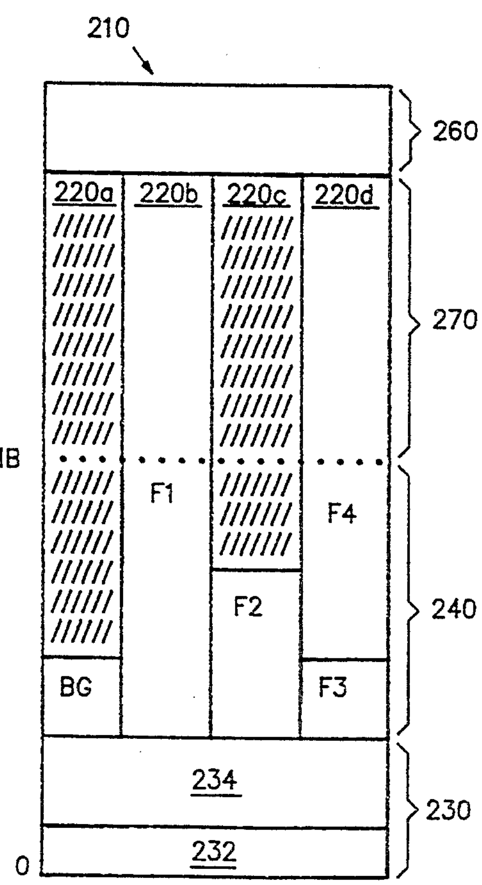
FIG. 3 shows a diagram of the 31-bit addressing scheme of the current invention.

FIG. 3 shows a memory structure 210 which is used for 31-bit addressing. The memory structure 210 below the 16 MB boundary is the same as that shown in FIG. 2 and the same elements in the two figures are given reference signs that differ by 100. In order to distinguish them from their counterparts above the 16 MB boundary, the shared areas 230 and the private areas 240 below the 16 MB boundary are denoted shared area (24-bit) and private area (24-bit) respectively.

FIG. 3 shows, in addition to the elements of FIG. 2, a private area (31-bit) 270 and a shared area (31-bit) 260. The private area (31-bit) 270 and the shared area (31-bit) 260 have exactly the same functions as their 24-bit counterparts. The shared area (31-bit) 270 contains frequently used programs which are available for concurrent use by programs executing in any of the partitions BG, F1–4. This area is, however, in general only available for use by application programs which use 31-bit addressing schemes. it contains no programs or data that are used by application programs written using 24-bit addressing since these programs cannot address this space directly. An exception to this rule will be explained later since it may be possible for programs residing in the shared area (31-bit) 260 to be used provided there is a pointer from a location in the shared area (24-bit) 234.

The private area (31-bit) 270 can only be used by applications programs which have been written for 31-bit addressing. These type of programs treat the whole of the private area, comprising both the private area (24-bit) 240 and the private area (31-bit) 270, as one continuously addressable space. If an applications program is written with 24-bit addressing, however, it can only make use of the address space up to the 16 MB boundary, i.e. only the private area (24-bit) 240.

In one embodiment of the invention, no boundaries between partitions can be placed within the private area (31-bit) 270 and thus only one partition can occupy the private area (31-bit) 270. This ensures compatibility with programs written for 24-bit addressing.

Due to the hardware considerations in one embodiment of the invention, the memory in a particular VSE operation system is divided into 1 MB segments. This means that the division between the private areas 240 and 270 and the shared areas 230 and 260 must occur at a 1 MB boundary. Thus in order to ensure that as much address space as possible is available to run applications programs written for 24-bit addressing, the total amount of address space used by the supervisor 232 and the shared area (24-bit) 234 should be rounded to just under a 1 MB boundary. Routines and data directly required by programs written for 24-bit addressing in the shared area must be placed. These routines can only work in 24-bit addressing mode and thus cannot be placed in the shared area (31-bit) 260. Routines using 31-bit addressing mode may also be placed in the shared area (24-bit) 234. All other routines and data are placed in the shared area (31-bit) 260. Such routines and data would include the system GETVIS area, phases, and system related control information such as tables and control blocks.

Every applications program operating in VSE/ESA must be assigned two program attributes: an addressing mode and a residency mode. The addressing mode (AMODE) is the type of addressing that is expected when the program (or the module within the program) is entered and can have one of the following values:

| | |
|---|---|
| AMODE 24 | the program is designed to receive control in 24-bit addressing mode. |
| AMODE 31 | the program is designed to receive control in 31-bit addressing mode. |
| AMODE ANY | the program is designed to receive control in either 24-bit or 31-bit addressing mode. |

The residency mode (RMODE) is a program attribute that states the virtual storage location in which the program should reside and can have one of the following values:

| | |
|---|---|
| RMODE 24 | the program is designed to reside below 16MB in virtual storage. VSE/ESA will place the program below 16MB. |
| RMODE ANY | the program is designed to reside at any virtual storage location, either above or below 16MB. VSE/ESA places the program above 16MB unless there is no suitable storage above 16MB available. |

Programmers can specify these attributes for new programs. The attributes can be added to older programs if required, otherwise VSE/ESA assigns a default value when no AMODE or RMODE is specified.

At execution time there are only three valid AMODE/RMODE combinations: AMODE 24/RMODE 24, AMODE 31/RMODE 24 and AMODE 31/RMODE ANY. Of these, the combination AMODE 24/RMODE 24 is the default combination to ensure compatibility with older programs written with 24-bit addressing schemes.

In the IBM ES/9000 series of computers, the current addressing scheme in which a program is operating is given by the value of the A-mode bit in the Program Status Word (PSW). The function of the PSW and its A-mode bit is described in more detail in the "IBM Enterprise Systems Architecture/390: Principles of Operation", IBM Corp. 1990, IBM Publication Number SA22-7201-0.

The value of the bit can be changed in a number of ways. For example, the Enterprise System Architecture of the IBM S/390 incorporates a number of instructions which change the value of the A-mode bit during program execution. These instructions allow older applications programs using 24-bit addressing to be "glued" to newer applications programs which use 31-bit addressing. Examples of these instructions are the Branch and Set Mode (BSM) instruction and the Branch and Save and Set Mode (BASSM) instruction. Further details of their operation are given in the above-referenced IBM publication number SA22-7201-0.

Figure 4:
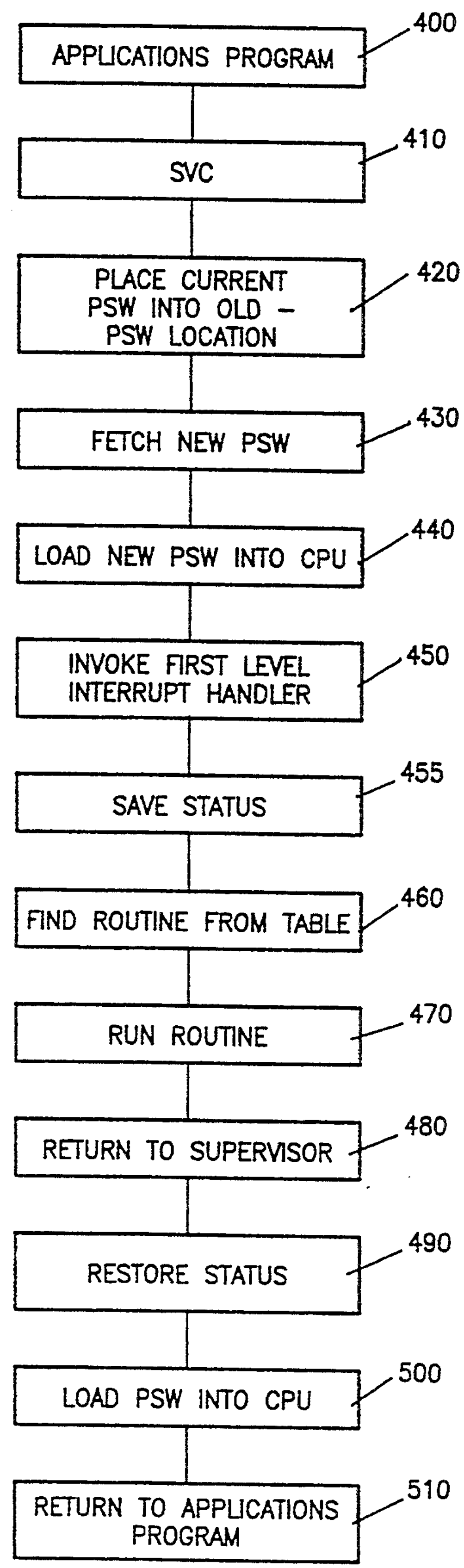
FIG. 4 shows a flow diagram for calling routines in the shared areas from applications programs running in private areas.

Access to the data and routines in the shared area (31-bit) 260 is carried out in the same manner as access to the shared area (24-bit) 230 and is shown in FIG. 4. From the applications program running in the private area (24-bit) 240 and/or the private area (31-bit), a call (step 410) can be made to the supervisor 232. In the IBM S/390 Enterprise System Architecture this routine is denoted "SUPERVISOR CALL" and abbreviated to SVC. For more details on the operation of this routine, reference is made to the above referenced IBM Publication Number SA22-7201-0. It should be noted that the supervisor-call instruction is only one example of access to data or routines in the shared areas 230 and 260. Other instructions in the IBM S/390 Enterprise System Architecture and in other architectures may carry out similar accesses.

The interruption caused by the supervisor-call instruction causes the current PSW to be placed in an assigned storage location called the old-PSW location (step 420). A new PSW is fetched (step 430) from a second storage location and is loaded (step 440) into the CPU (central processing unit). This new PSW consists essentially of a control block and an address. The address points (step 450) to a first-level interrupt handler which saves the system status (step 455) and in turn uses the SVC number associated with the supervisor-call interruption to look in a table stored in the supervisor 232 to find the routine indicated by the SVC number (step 460). This routine might be stored either in the shared area (24-bit) 234 or in the shared area (31-bit) 260 and the table will indicate the addressing mode in which the routine operates. As stated above, the shared area in which the routine is placed depends on whether it uses 24-bit addressing or 31-bit addressing. The routine is then called and run (step 470)

After completion of the routine, control is returned to the applications program from which the supervisor-call instruction was issued. This is done by returning to the supervisor (step 480) which restores the status (step 490) and loads (step 500) the old PSW into the CPU. The next instruction in the applications program after the supervisor-call instruction is then carried out (step 510).

This invention is not limited to ensuring compatibility of 24-bit addressing scheme with 31-bit addressing schemes. It can be further extended to ensure compatibility of all addressing schemes using a smaller number of bits with addressing schemes using a large number of bits. The upper shared area—in the example of the current application denoted as shared area (31-bit) 260—must be accordingly moved such that it ends at the highest addresses of the addressing scheme used and contains routines which use such an addressing scheme. Thus the scope of protection of this invention is limited only by the following claims and their equivalents.

I claim:

1. A method implemented in a computer system for accessing system functions stored in shared memory areas of an N+M bit addressed memory region, said method comprising the steps of:

defining and storing a routine and a first system function in a first shared memory area encompassing a lowest address range of said memory region, defining and storing a second system function in a second shared memory area encompassing a highest address range of said memory region, and defining and storing first and second application programs in a private memory area spanning between said first and second shared memory areas in said memory region, said first application having N bit addressing encompassing said first shared memory area and said private memory area but not said second shared memory area, and said second application having at least N+M bit addressing encompassing said first and second shared memory areas and said private memory area;

said first application calling said first system function directly, said first application being precluded by said N bit addressing from calling said second system function directly; and said first application calling said routine, and in response said routine calling said second system function on behalf of said first application.

2. A method as set forth in claim 1 further comprising the steps of:

said second application calling said first system function directly; and said second application calling said second system function directly.

3. A method as set forth in claim 1 wherein said first shared memory area, said private memory area and said second shared memory area form a continuous address range.

4. A method as set forth in claim 1 further comprising the step of said routine returning control to said first application after said second system function is completed after being called by said routine on behalf of said first application.

5. A method as set forth in claim 1, wherein said first shared memory area also stores a supervisor program for said first and second applications.

6. A method as set forth in claim 1, wherein said first system function spools data into and out of I/O devices.

7. A computer system comprising:

means for defining a first shared memory area encompassing a lowest address range of a memory region, means for storing a routine and a first system function in said first shared memory area, means for defining a second shared memory area encompassing a highest address range of said memory region, means for storing a second system function in said second shared memory area, means for defining a private memory area spanning between said first and second shared memory areas in said memory region, and means for storing first and second application programs in said private memory area, said first application having N bit addressing encompassing said first shared memory area and said private memory area but not said second shared memory area, and said second application having at least N+M bit addressing encompassing said first and second shared memory areas and said private memory area;

means for calling said first system function directly by said first application, said first application being precluded by said N bit addressing from calling said second system function directly; and means for calling said routine by said first application, and in response calling said second system function by said routine on behalf of said first application.

8. A computer system as set forth in claim 7 further comprising:

means for calling said first system function directly by said second application; and means for calling said second system function directly by said second application.

9. A system as set forth in claim 7 wherein said first shared memory area, said private memory area and said second shared memory area form a continuous address range.

10. A system as set forth in claim 7 further comprising means for returning control from said routine to said first application after said second system function is completed after being called by said routine on behalf of said first application.

11. A system as set forth in claim 7, wherein said first shared memory area also stores a supervisor program for said first and second applications.

12. A system as set forth in claim 7, wherein said first system function spools data into and out of I/O devices.

* * * * *